United States Patent [19]

Anderson

[11] 4,102,133

[45] Jul. 25, 1978

[54] MULTIPLE WELL DUAL FLUID GEOTHERMAL POWER CYCLE

[76] Inventor: James Hilbert Anderson, 1615 Hillock La., York, Pa. 17403

[21] Appl. No.: 789,369

[22] Filed: Apr. 21, 1977

[51] Int. Cl.² .............................................. F03G 7/04
[52] U.S. Cl. ........................................ 60/641; 60/651; 60/655; 60/676
[58] Field of Search ............... 60/641, 651, 655, 671, 60/676; 165/45

[56] References Cited

U.S. PATENT DOCUMENTS

| 3,795,103 | 3/1974 | Anderson | 60/655 X |
| 3,845,627 | 11/1974 | Hutchinson | 60/651 X |
| 3,961,866 | 6/1976 | Nichols | 165/45 X |

*Primary Examiner*—Allen M. Ostrager
*Assistant Examiner*—Stephen F. Husar
*Attorney, Agent, or Firm*—Albert L. Gabriel

[57] ABSTRACT

Heat energy from hot geothermal fluids supplied by different temperature wells is transferred by heat exchange into a power fluid cycle, preferably of the dual fluid type, at different points in the cycle, which both enables an increase in peak cycle temperature to be achieved and allows more heat energy to be transferred into lower temperature points in the cycle. The result is an increase in the amount of power which can be developed per unit of geothermal fluid supplied.

40 Claims, 3 Drawing Figures

MULTIPLE WELL DUAL FLUID GEOTHERMAL POWER CYCLE

BACKGROUND OF THE INVENTION

1. Field of the Invention

This invention is in the field of power production from geothermal energy sources.

2. Description of the Prior Art

In a given geothermal field where a number of geothermal hot water wells are drilled, substantial temperature differences can be expected to be found in the hot water produced by different wells. Such temperature variations may be caused by a variety of factors, such as different rates of heat flow to the surface of the ground, different types of rock strata, different depths at which the hot water-bearing strata occur, and different distances of the wells from the high temperature geographical center of the field. Thus, for example, in the Imperial Valley of Southern California there are geothermal hot water fields where large amounts of geothermal hot water at temperatures on the order of about 370° F. are found at depths of about 5,000 to 6,000 feet; while in the same fields at depths of only about 2,000 feet even larger amounts of geothermal hot water are found at temperatures on the order of about 300° F. Also, a geothermal hot water field will typically have a large peripheral area where the geothermal hot water resource is considerably cooler than that of the center part of the field, but still at sufficiently high temperatures to be useful in the production of power. Utilization of these upper level and peripheral area cooler geothermal resources can increase the power output from a given geothermal field on the order of two to three times.

Another factor which may result in geothermal hot water wells of a given field having different temperatures is where geothermal hot water may be withdrawn from some wells at a greater rate than the heat flows normally from the water to the surface. With such a condition it can be expected that the supply temperature at the bottom of the well may decrease with time, and this could be expected to differ for various wells in a given field, so that it would result, in time, in different temperature wells in the field.

It is known in the art to produce power from geothermal hot water wells by transferring heat from the geothermal water in surface heat exchangers to a power or working fluid so as to boil and superheat the power fluid under high pressure, the power fluid being employed in a closed Rankine cycle to develop power. In such a system the geothermal hot water may be pumped from the well as taught in Barkman C. McCabe Pat. No. 3,757,516 to prevent flashing in the well or in the heat exchangers; or it may be allowed to flow up out of the well under the power of its own flashing steam, and then either the combined hot water and steam may be flowed through the heat exchangers or it may be passed through steam separators, with the steam then being passed through the heat exchangers.

The James Hilbert Anderson U.S. Pat. No. 3,795,103 discloses how the efficiency of such a system where the heat energy of geothermal hot water is transferred to a separate power fluid cycle can be improved by employing two or more power fluids which boil at different temperatures in respective separate closed Rankine cycles, and diverting a portion of the geothermal hot water from a higher temperature power fluid cycle to a lower temperature power fluid cycle.

The conventional approach where the heat energy from a plurality of geothermal wells is to be transferred through heat exchangers into a power fluid cycle would be to mix the geothermal fluid, whether it be pumped hot water, a combination of hot water and steam, or separated steam, from the wells prior to entry into the cycle process, i.e., prior to heat exchange with the power fluid. The temperature of the geothermal fluid mixture at the point of entry into the cycle process would thus be an average temperature between the temperatures of the high temperature well and the low temperature well, and in a typical situation where the flow rate for the low temperature well would be greater than that for the high temperature well, this average geothermal fluid temperature would be closer to the temperature of the low temperature well than to that of the high temperature well.

This substantially lower temperature for the fluid mixture from the plurality of wells than the temperature of the fluid from the hottest well would result in a correspondingly lower temperature to which the power fluid could be superheated in the cycle, with a resulting loss in the amount of power that could be derived from the power fluid cycle. In a multiple power fluid cycle like that disclosed in James Hilbert Anderson Pat. No. 3,795,103, this reduced entry temperature of the geothermal fluid mixture into the cycle would generally require that a disproportionate volume of the geothermal fluid mixture be directed to a higher temperature power fluid part of the system at the expense of a lower temperature power fluid part of the system, with a resulting reduced efficiency in the overall system.

The efficiency would be similarly reduced in a waste heat power plant where a plurality of hot fluid streams at different temperatures are available for generating power at relatively low temperatures, if the streams were mixed before their heat energy was transferred into a power fluid cycle.

SUMMARY OF THE INVENTION

In view of these and other problems in the art, it is an object of the present invention to provide a novel geothermal power system wherein the output flows of a plurality of different temperature geothermal wells are introduced at different points in a power fluid cycle, enabling a greater amount of power to be developed per unit of geothermal fluid than could be obtained by mixing the flows from the wells prior to introduction thereof into the power fluid cycle.

Another and more general object of the present invention is to provide a novel multiple well geothermal power system that is capable of materially increasing the overall amount of power that can be produced from any given geothermal field.

Another object of the invention is to provide a system for deriving power from a plurality of different temperature geothermal wells wherein the temperature to which a power fluid is raised is determined by the temperature of the fluid from the highest temperature geothermal well rather than by the temperature of a mixture of the fluids from the wells, whereby greater power can be produced in a vapor expansion device such as a turbine driven by the power fluid.

A further object of the present invention is to provide an improved multiple power fluid cycle of the type disclosed in James Hilbert Anderson Pat. No. 3,795,103, wherein the efficiency of the power cycle is improved by utilizing different temperature geothermal fluids from a plurality of geothermal wells at different points in the cycle.

A still further object of the invention is to provide a multiple well geothermal power system of the character described wherein higher turbine exhaust vapor temperature is available enabling the turbine exhaust vapor to be efficiently utilized in a recuperator for partially heating the power fluid, and this in turn frees some of the geothermal fluid for more efficient use in a lower temperature part of the system, as for example for transferring heat to a lower temperature power fluid pursuant to the same James Hilbert Anderson Pat. No. 3,795,103.

An additional object of the invention is to provide a power system of the character described which is also applicable to improve thermal power plant efficiency where a plurality of hot fluid streams are available from a source other than geothermal wells, as for example where a plurality of waste heat fluid streams are available at different temperatures for generating power in a waste heat power plant.

The present invention is applied where at least two hot fluid streams are available at different temperatures, as for example from a plurality of geothermal wells or from waste heat sources. Where the source is a plurality of geothermal wells, the hot fluid streams may be hot water, a combination of hot water and steam, or separated steam. Although the invention is applicable to a single power fluid cycle, for highest efficiency it is preferred to apply the invention to a system having at least two power fluids which boil at different temperatures in separate Rankine circuits. The high temperature power fluid is heated in a series of progressively hotter heat exchange steps terminating in a final, hottest heat exchange step involving heat exchange from only the highest temperature fluid stream, wherein the high temperature power fluid is heated to its highest temperature, superheated condition just prior to being expanded to produce power. This enables the high temperature power fluid to be raised to a considerably higher temperature than if it were heated by a mixture of the hot fluid streams, whereby the high temperature power fluid turbine can produce more power; and this also makes higher temperature turbine exhaust vapor available for heat exchange with one of the power fluids, preferably the high temperature power fluid, in a relatively low temperature part of the system, which then frees a much larger amount of the fluid from the hot fluid streams than would otherwise be available for heat exchange with one of the power fluids, preferably the low temperature power fluid, in a relatively low temperature part of the system. By this means the present invention enables a greater amount of power to be produced per unit of hot fluid flowing through a thermal power plant.

BRIEF DESCRIPTION OF THE DRAWINGS

These and other objects of the invention will become more apparent in reference to the following description and the accompanying drawings, wherein.

DETAILED DESCRIPTION

Figure 2:
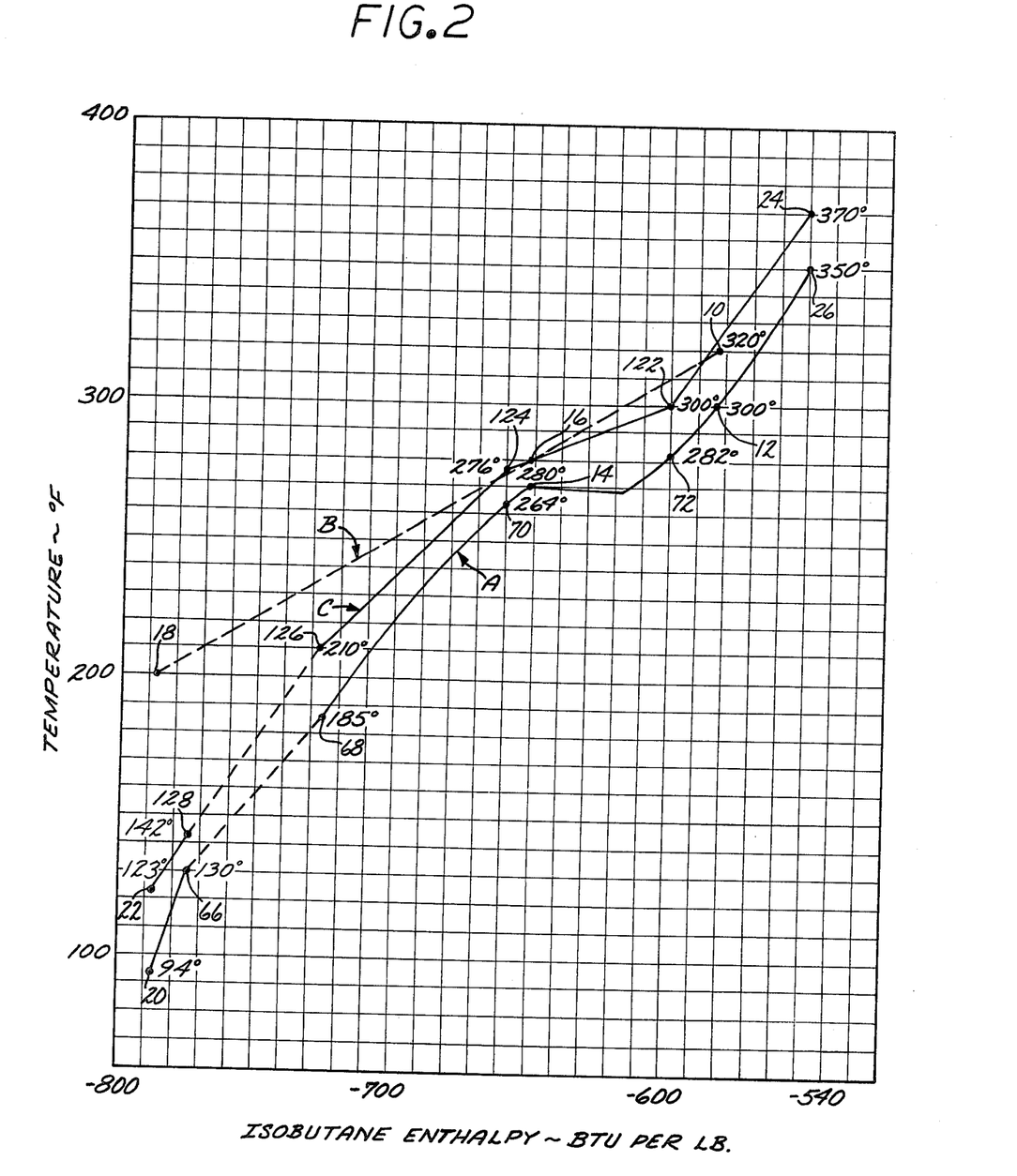
FIG. 2 is a graph illustrating the heat transfer between the hot geothermal fluids from two wells and the high temperature power fluid (in this case isobutane) in a dual power fluid cycle, and comparing same with the heat transfer if the hot geothermal fluids from the two wells has been mixed prior to entry into the dual cycle.

Reference will first be made to FIG. 2 of the drawings which graphically illustrates how a plurality of hot fluid streams at different temperatures are advantageously used according to the present invention to develop a greater amount of power per unit of hot fluid by utilizing the different temperature fluid streams at different points in the power cycle, than could be obtained by the conventional approach of mixing the hot fluid streams before applying them to the power cycle.

For convenience in the following detailed description the invention will be described with respect to geothermal wells of different temperatures which provide geothermal hot water to the power cycle. It is to be understood, however, as indicated in the above Summary, that the invention is equally applicable where the hot geothermal fluid from the different temperature wells is either a combination of hot water and steam or separated steam. It is also to be understood that the invention is not limited to power plants where the heat source is hot geothermal fluid, but is also applicable to thermal power plants where some other hot fluid source is used, as for example a waste heat power plant where a plurality of waste heat fluid streams are available at different temperatures.

Curve A in FIG. 2 is a plot of temperature in degrees Fahrenheit against enthalpy in BTUs per pound typical for isobutane (designated $ic_4$ in the drawings for convenience) used as a power fluid in a closed Rankine power cycle receiving its heat energy by heat exchange from geothermal hot water. Isobutane is used as a power fluid in the present example because it is particularly efficient in the temperature range under consideration as indicated in McCabe U.S. Pat. No. 3,757,516, although it is to be understood that other power fluids may be employed.

Curve B represents a typical temperature profile for hot water from two geothermal wells at different temperatures which is mixed before entering the cycle process and utilized to transfer heat through heat exchangers to the power fluid in a single power fluid cycle as represented for isobutane in Curve A. In this example, it will be assumed that one of the geothermal wells is supplying water at a temperature of 370° F. and the other geothermal well is supplying water at a temperature of 300° F.; and it will also be assumed that the flow rate for the 370° F. wells is 40% of the flow rate for the 300° F. well.

Curve C is a temperature profile for hot water supplied from these same 370° F. and 300° F. geothermal wells in a proposed pilot electric power generating plant of 10 megawatt capacity wherein the hot water from the two wells is introduced at separate points in the power cycle in accordance with the present invention, and utilizing a dual power fluid cycle as disclosed in James Hilbert Anderson U.S. Pat. No. 3,795,103.

The mixture of hot water from these two wells provides an average temperature of 320° F., which is the high temperature point 10 on curve B. This 320° F. temperature for the mixture is only capable of superheating the isobutane power fluid to a temperature of about 300° F. as represented by point 12 on curve A. Curve B for the geothermal water mixture is approximately a straight line curve, and inasmuch as the water mixture temperature must be higher than the isobutane temperature at all parts of the cycle in order to cause heat to flow into the isobutane, the slope of curve B downwardly to the left from its high temperature point 10 is then determined by curve A for the isobutane power fluid. In practice it is required that the hot water temperature be at least about 10° F. higher than the isobutane temperature at all intermediate parts of the cycle, and it will be apparent from FIG. 2 that the closest point between curves A and B will be at the pinch point 14 on the isobutane curve A where the isobutane commences boiling. Point 14 on curve A is at about 270° F., so that the minimum temperature for the hot water mixture on curve B which corresponds in enthalpy is the point 16 at about 280° F. Projecting the straight line curve B on to the left from point 16 to the minimum enthalpy position, it is found that the hot water mixture must leave the cycle at point 18 at a temperature of about 200° F. In contrast, the isobutane at the beginning of its heating cycle is only about 94° F. as indicated at point 20 on curve A, and this very large temperature spread between the lower portions of curves B and A illustrates that there still remains a large amount of usable heat in the geothermal water mixture which would normally be wasted in such a cycle. In contrast, it will be noted from curve C, which represents a cycle according to the present invention, that the geothermal hot water from the two wells is brought down to a minimum temperature at point 22 of about 123° F., and that the lower portion of curve C closely parallels curve A below the pinch point 14, indicating the transfer of a maximum amount of heat energy from the geothermal hot water to the isobutane.

Thermal energy is also wasted at the high temperature end of the cycle where the water from the two wells is mixed prior to entering the cycle as in curve B. Thus, the high temperature for the geothermal water mixture from the two wells at point 10 on curve B is only about 320° F., so that the maximum temperature to which the isobutane can be raised on curve A is only about 300° F. at point 12. However, the 370° F. temperature for the hotter of the two wells has the potential for raising the isobutane to 350° F., which would enable greater turbine power to be produced in the isobutane power circuit. It will be seen in FIG. 2 that curve C for the geothermal hot water as employed in the present invention extends all of the way up to this high temperature of 370° F. at point 24, enabling the isobutane to be raised to a corresponding high point of about 350° F. represented by point 26 on curve A, and with the novel cycle of the present invention this not only enables more power to be extracted from the isobutane turbine, but it additionally enables further power to be derived from the turbine exhaust which is at higher temperature, and allows some of the thermal energy in the geothermal hot water to be saved for use in a second, lower temperature power fluid cycle.

Figure 1:
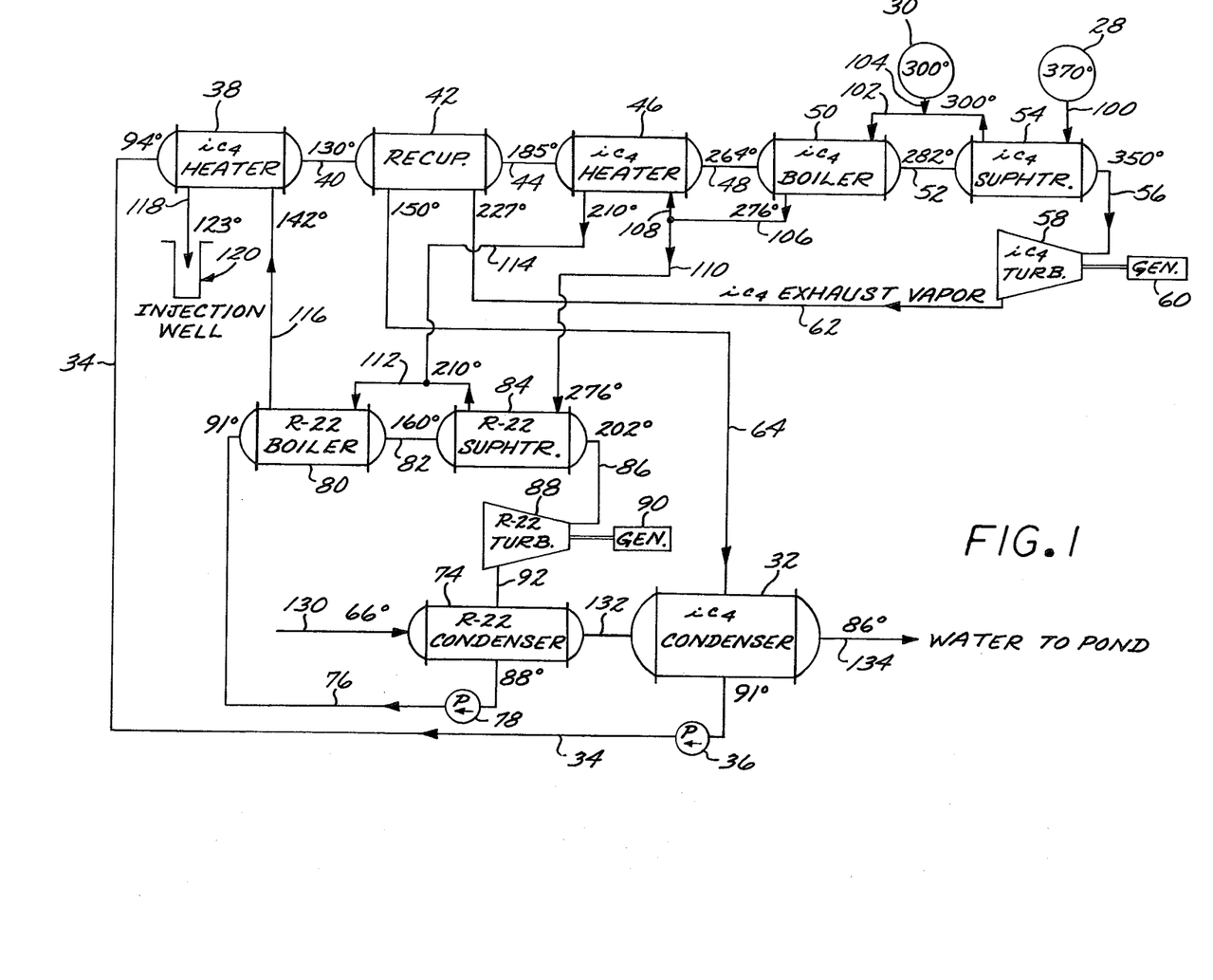
FIG. 1 is a diagrammatic view of a proposed pilot geothermal power plant embodying a multiple well dual fluid power cycle according to the present invention.

Reference will now be made to FIG. 1 which diagrammatically illustrates the cycle of the present invention. Fluid temperatures are designated at various points in the cycle for the example referred to in connection with FIG. 2 wherein geothermal hot water is supplied by a relatively high temperature geothermal well 28 at 370° F. and by a relatively low temperature geothermal well 30 at 300° F., with the flow rate of the high temperature well 28 relative to the low temperature well 30 being in the ratio of 4:10.

There are four different fluids employed in the cycle illustrated in FIG. 1, namely a relatively high temperature power fluid or working fluid, which in the example illustrated in FIG. 1 is isobutane $[(CH_3)_3CH]$; a relatively low temperature power fluid or working fluid, which in the example is the refrigerant R-22 $[CH\,Cl\,F_2]$ which has a lower boiling temperature than isobutane; geothermal hot water from the wells 28 and 30; and cold water utilized for cooling and condensing the vapors of the two power fluids back to liquids. Although the example described for the present cycle employs R-22 as the power fluid for the lower temperature Rankine cycle, it is to be understood that any other suitable power fluid having a substantially lower boiling point than the relatively high temperature power fluid (in this example, isobutane) may be employed. For example, another suitable low temperature power fluid for use in the present invention which is particularly efficient and economical is propane.

Referring at first to the isobutane circuit as illustrated in FIG. 1, the isobutane is condensed to its liquid state in isobutane condenser 32, the isobutane liquid leaving condenser 32 at a temperature of about 91° F. and being pumped through a conduit 34 by means of pump 36 to a first isobutane heater 38. The pump 36 pumps the liquid isobutane to a high pressure, as for example on the order of about 600 psia, and the pumping power raises the temperature of the isobutane liquid to about 94° F. as it enters the first isobutane heater 38. The liquid isobutane is heated in first isobutane heater 38 by heat exchange from a mixture of geothermal hot water from the two wells 28 and 30 to a temperature of about 130° F., and it then passes through a conduit 40 into a recuperator 42 where it is further heated to a temperature of about 185° F. by heat exchange from turbine exhaust isobutane vapor. The liquid isobutane then passes through a conduit 44 into a second isobutane heater 46 where it is heated to a temperature of about 264° F. by heat exchange from mixed geothermal hot water from the two wells 28 and 30. The isobutane, still in liquid form, then flows through a conduit 48 into isobutane boiler 50 where it is provided with heat by heat exchange from a mixture of geothermal hot water from the two wells 28 and 30, first being heated to a temperature of about 270° F., then being converted into vapor, and then being superheated to a temperature of about 282° F. The vaporized isobutane then passes through a conduit 52 into isobutane superheater 54 where it is heated to a temperature of about 350° F. by geothermal hot water from the high temperature well 28 only.

From the superheater 54, the isobutane vapor flows through a conduit 56 and then expands through isobutane turbine 58 where it produces power to drive an electric power generator 60 or other power-absorbing equipment. The isobutane vapor is exhausted from the turbine 58 at a temperature of about 227° F., and then passes back through a conduit 62 to the recuperator 42, where its temperature is reduced to about 150° F. in heating the liquid isobutane by heat exchange from about 130° F. to about 185° F. The isobutane vapor then passes out of the recuperator at about 150° F. and flows through a further conduit 64 to the isobutane condenser 32, where it is cooled and condensed to liquid by the cooling water.

Referring again to FIG. 2 of the drawings, curve A shows the temperature profile for the isobutane as it is successively heated in the first heater 38, recuperator 42, second heater 46, boiler 50 and superheater 54. On curve A, point 20 indicates the temperature (about 94° F.) of the liquid isobutane as it enters the first heater 38, point 66 indicates the temperature (about 130° F.) of the liquid isobutane as it leaves the first heater 38 and enters the recuperator 42, point 68 indicates the temperature (about 185° F.) of the liquid isobutane as it leaves the recuperator 42 and enters the second heater 46, point 70 indicates the temperature (about 264° F.) of the liquid isobutane as it leaves the second heater 46 and enters the boiler 50, point 72 indicates the temperature (about 282° F.) of the now vaporized isobutane as it leaves the boiler 50 and enters the superheater 54, and point 26 indicates the high temperature (about 350° F.) of the isobutane vapor as it leaves the superheater 54 and enters the expansion turbine 58.

Referring next to the R-22 circuit as illustrated in FIG. 1, the R-22 is condensed to its liquid state in R-22 condenser 74, the R-22 liquid leaving condenser 74 at a temperature of about 88° F. and being pumped through a conduit 76 by means of pump 78 to R-22 boiler 80. The pump 78 pumps the liquid R-22 to a high pressure and to a temperature of about 91° F. as it enters the R-22 boiler 80. The liquid R-22 is heated to a temperature of about 160° F. and partly converted to its vapor state in R-22 boiler 80 by heat exchange from a mixture of geothermal hot water from the two wells 28 and 30. The partly vaporized R-22 then passes through a conduit 82 to R-22 superheater 84 wherein vaporization of the R-22 is completed and the R-22 is superheated to a temperature of about 202° F. by heat exchange from mixed geothermal hot water from the two wells 28 and 30. The superheated R-22 vapor then flows through a conduit 86 to R-22 turbine 88 where it expands and produces power to drive an electric power generator 90 or other power-absorbing equipment. The exhaust R-22 vapor from turbine 88 is then returned through a conduit 92 to the R-22 condenser 74 where it is condensed to its liquid state.

Figure 3:
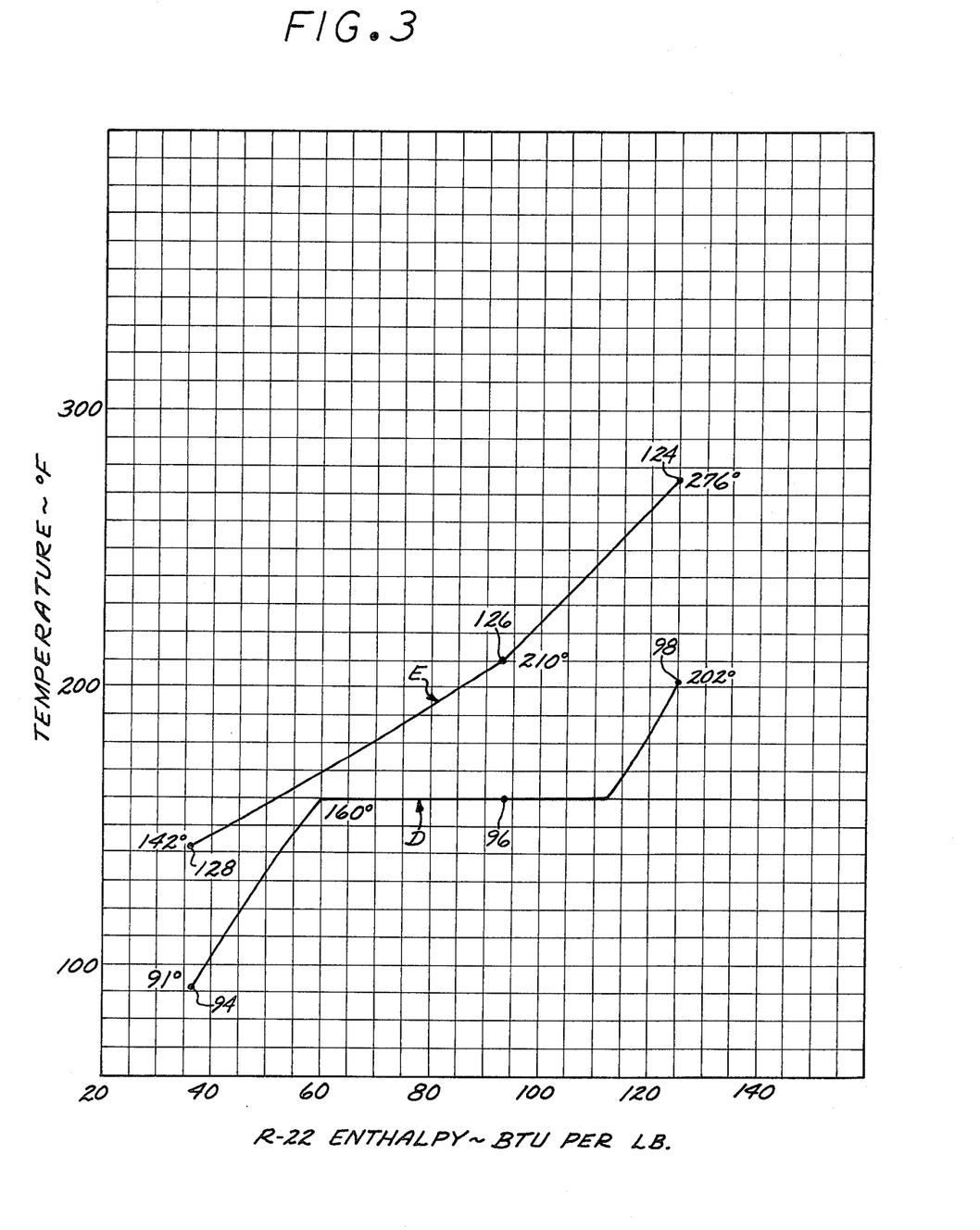
FIG. 3 is a graph similar to FIG. 2 illustrating the heat transfer from the hot geothermal fluid from the two wells to the lower temperature power fluid (in this case the refrigerant R-22) in the dual power fluid cycle.

Referring to FIG. 3 of the drawings, curve D is a plot of temperature in degress Fahrenheit against enthalpy in BTUs per pound for the R-22 in its heating cycle as described above in connection with FIG. 1. Curve E in FIG. 3 represents the temperature profile for the mixed water from the two geothermal wells 28 and 30 as it is applied in the R-22 boiler 80 and R-22 superheater 84 for heating, boiling and superheating the R-22 as indicated on the curve D.

On curve D, the point 94 indicates the temperature (about 91° F.) of the liquid R-22 as it enters the R-22 boiler 80, point 96 indicates the temperature (about 160° F.) and enthalpy condition of the R-22 as it leaves the R-22 boiler 80 and enters the R-22 superheater 84, and point 98 indicates the high temperature (about 202° F.) of the R-22 vapor as it leaves the superheater 84 and enters the expansion turbine 88.

Referring now to the geothermal well water circuit as illustrated in FIG. 1, the well water from the high temperature well 28 enters the isobutane superheater 54 through a conduit 100 at a temperature of 370° F. where it gives up heat to superheat the isobutane and is reduced in temperature to about 300° F. when it leaves superheater 54 through a conduit 102. At this point, the 300° F. well water from the low temperature geothermal well 30 is injected through a conduit 104 into the conduit 102 to mix with the water from the high temperature geothermal well 28 which is now also at about 300° F. The mixture of water from both wells then passes from conduit 102 through the isobutane boiler 50 where it gives up heat energy to heat, boil and commence superheating of the isobutane, the mixture of water from both wells then leaving boiler 50 through a conduit 106 at a temperature of about 276° F. and at this point in the circuit being divided, with a portion thereof passing to second isobutane heater 46 through a conduit 108, and the remainder thereof passing to the R-22 superheater 84 through a conduit 110.

That portion of the hot water mixture from both wells which enters R-22 superheater 84 gives up heat energy therein to complete the vaporization of the R-22 and to superheat the R-22, leaving the R-22 superheater 84 at a temperature of about 210° F. through a conduit 112. At the same time, that portion of the hot water mixture from both wells which entered the second isobutane heater 46 heats the isobutane therein and leaves the heater 46 also at a temperature of about 210° F. through a conduit 114 which communicates with conduit 112 to then pass the full flow of water from both wells into the R-22 boiler 80. The hot water mixture then gives up further heat energy in the R-22 boiler 80 to heat and partially vaporize the R-22 therein, the water mixture leaving R-22 boiler 80 through a conduit 116 at a temperature of about 142° F. and entering the last heat exchanger in the geothermal hot water circuit which is the first isobutane heater 38, wherein the hot water mixture gives up further heat energy to heat the isobutane. The mixed water from both geothermal wells 28 and 30 then leaves the isobutane heater 38 through a conduit 118 at a temperature of about 123° F. and is reinjected into the underground geothermal hot water system through a suitable injection well 120.

Curve C in FIG. 2 and curve E in FIG. 3 show the temperature profiles for the geothermal hot water from wells 28 and 30 respectively for the isobutane heating circuit and the R-22 heating circuit. Referring at first to curve C, the high temperature point 24 indicates the temperature (370° F.) at which the hot water from high temperature well 28 only enters isobutane superheater 54. Point 122 on curve C indicates the temperature (about 300° F.) of both the water from the low temperature well 30 and the water from high temperature well 28 which has passed through isobutane superheater 54, the point 122 thus representing the temperature at which the water from both wells is mixed and then enters the isobutane boiler 50.

Point 124 indicates the temperature (above 276° F.) of the mixed water from both wells as it leaves the isobutane boiler 50 and is split so that part of it enters the second isobutane heater 46 and part of it enters the R-22 superheater 84; accordingly, the point 124 is found on both curve C and curve E, being an intermediate point on curve C and being the high temperature point on curve E. Similarly, the point 126 is also located on both curve C and curve E, and represents the temperature (about 210° F.) of the mixed water from both wells as it leaves the second isobutane heater 46 and the R-22 superheater 84 and is added together again to flow into the R-22 boiler 80.

Point 128 is also seen on both curve B and curve E, being an intermediate temperature point on curve C and being the low temperature point on curve E. Point 128 indicates the temperature (about 142° F.) at which the hot water mixture from both wells leaves the R-22 boiler 80 and enters the first isobutane heater 38. It will be noted that the portion of curve C located between points 126 and 128 is shown as a dotted line, which is to indicate that the well water is not involved with the isobutane heating circuit between points 126 and 128. Similarly, the isobutane curve A is dotted between points 66 and 68, which correspond respectively to points 128 and 126 on curve C, to indicate that the isobutane is not being heated by the geothermal water between points 66 and 68 on curve A, but instead is being heated by exhaust isobutane vapor from the isobutane turbine 58 in the recuperator 42 between these points.

Finally, point 22, which is the low temperature point on curve C, indicates the temperature (about 123° F.) that the mixed water from both of the wells 28 and 30 leaves the first isobutane heater 38 and is passed to the injection well 120.

Referring again to FIG. 1, the cooling water circuit employs suitable cooling apparatus such as a cooling pond, cooling tower, or the like, for providing cold water to condense the R-22 and the isobutane. The cold water is supplied from such cooling apparatus at a temperature assumed to be about 66° F. through a conduit 130 to the R-22 condenser 74, and thence through a conduit 132 to the isobutane condenser 32, and is then discharged back to the said cooling apparatus through a conduit 134. The cooling water will be heated from about 66° F. to about 86° F. in the condensers 74 and 32, and will be re-cooled back down to about 66° F. in the said cooling apparatus.

It will be noted that by using only the high temperature well water from the well 28 in the isobutane superheater 54, it is possible to superheat the isobutane gas to a temperature of about 350° F., whereas if the water from both of the wells 28 and 30 were mixed before entering the superheater, the isobutane could only have been superheated to a temperature of about 320° F. This much higher temperature of the superheated isobutane, as it enters the isobutane turbine 58, permits the turbine 58 to produce considerably more power than if the isobutane were only heated to 320° F., and also causes the exhaust temperature of the isobutane vapor from the turbine 58 to be substantially higher than it would have been if the isobutane had entered the turbine at a temperature of only about 320° F. This, in turn, makes considerably higher temperature heat available for heating the liquid isobutane in the recuperator 42. By having this higher temperature heat available in the recuperator, it makes it possible to transmit considerably more turbine exhaust heat to the isobutane, thereby saving a substantial part of the heat energy of the geothermal hot water to produce more power in the R-22 boiler 80. This combination of using the high temperature water from the well 28 for achieving the maximum possible superheat of the isobutane, and then freeing some of the geothermal water for use in heating a lower temperature power fluid in a dual fluid power cycle, permits a more efficient plant, and allows the production of more power per unit of geothermal hot water than would be possible if the water from the two wells had been mixed before entering the cycle.

It is estimated that the geothermal hot water consumption per kilowatt hour of energy produced would drop from a figure such as about 139 pounds per net kilowatt hour for the premixed water conditions indicated by curve B in FIG. 2, to a value of less than 100 pounds per net kilowatt hour for the water conditions of the present invention as indicated by curve C in FIG. 2 and curve E in FIG. 3.

Although the present invention has been shown and described hereinabove in detail in connection with only two geothermal wells at different temperatures, it is to be understood that the present invention is equally applicable to the introduction at different parts of the power cycle of hot water from any number of different temperature geothermal wells. Also, while the invention has been shown and described in connection with a dual power fluid cycle, it is to be understood that introduction of hot water from different temperature geothermal wells at different points in the power cycle pursuant to the invention may be employed in a single power fluid cycle, or in a cycle using more than two power fluids.

In the specific examples described hereinabove and illustrated in the drawings for a proposed 10 megawatt pilot plant, the geothermal fluid from two wells was mixed for subsequent use in lower temperature heat exchange steps after the fluid from the hotter well had given up some of its heat to raise power fluid to its highest temperature, superheated condition just prior to its expansion to produce power. Such mixing of the geothermal fluid from the wells was enabled because of the relatively small size of this proposed pilot plant, and permitted a minimum number of heat exchangers to be employed with a consequent minimization of cost. However, it is to be understood that in a full-size geothermal electrical power generating plant embodying the invention, as for example a plant of 50 megawatt capacity or greater, it is likely that some or all of the different temperature geothermal fluid streams, each of which may be from one or more wells, would not be mixed at any point in the system, or if mixed then only for use in a lesser proportion of the heat exchange steps. Thus, for example, in a full-size plant different temperature geothermal fluid streams may be flowed through separate but parallel heat exchange routes in the lower temperature heat exchange steps. Alternatively, one or more of the different temperature geothermal fluid streams may, as has been shown and described for the highest temperature heat exchange step, be employed alone for one or more of the lower temperature heat exchange steps.

In a full-size geothermal power plant according to the invention it will also be desirable to provide piping and valving suitable for switching the geothermal fluid supply to one or more of the heat exchange stages from one well to another so as to compensate for temperature changes in the wells during use and thereby enable the present invention to be employed with maximum efficiency over a long operational life.

It is also to be understood that the particular power fluid compositions and the well and cycle temperatures referred to herein have been given by way of example only, and are not intended to in any way limit the scope of the present invention. Thus, while the present invention has been described with regard to a particular embodiment, modifications may readily be made by those skilled in the art, and it is intended that the claims cover any such modifications which fall within the spirit and scope of the invention.

I claim:

1. The method of producing power from geothermal energy which comprises:

providing first and second hot geothermal fluids from respective first and second geothermal wells, said first geothermal fluid being provided at a higher temperature than said second geothermal fluid, transferring heat energy from said first geothermal fluid in a first heat exchange step into a power fluid cycle of the type which is adapted to produce power by power fluid expansion, so as to raise the temperature of power fluid in said cycle to a first temperature, and transferring heat energy from said second geothermal fluid in a second heat exchange step into said power fluid cycle so as to raise the temperature of power fluid in said cycle to a second temperature that is lower than said first temperature.

2. The method of claim 1, wherein heat energy from only said first geothermal fluid is transferred into said power fluid cycle in said first heat exchange step.

3. The method of claim 1, wherein said first power fluid temperature is the highest temperature to which power fluid is raised in said cycle prior to expansion thereof to produce power.

4. The method of claim 1, wherein said power fluid cycle produces power by expansion of power fluid in a turbine, and which comprises transferring heat energy from exhaust vapor from said turbine in a third heat exchange step back into said power fluid cycle to raise the temperature of power fluid in said cycle.

5. The method of claim 4, wherein said third heat exchange step raises power fluid in said cycle to a temperature that is lower than said second temperature.

6. The method of claim 4, wherein said third heat exchange step raises power fluid in said cycle to a temperature that is higher than said second temperature and lower than said first temperature.

7. The method of claim 1, wherein heat energy from a mixture of said first and second geothermal fluids is transferred into said power fluid cycle in said second heat exchange step.

8. The method of claim 1, wherein said power fluid cycle comprises first and second power fluids in separate fluid circuits, said first power fluid having a higher boiling temperature than said second power fluid, heat energy being transferred into said first power fluid circuit in said first heat exchange step.

9. The method of claim 8, wherein heat energy is transferred into said second power fluid circuit in said second heat exchange step.

10. The method of claim 8, wherein said first power fluid comprises isobutane.

11. The method of claim 8, wherein said second power fluid comprises the refrigerant R-22.

12. The method of claim 8, wherein said second power fluid comprises propane.

13. The method of claim 8, wherein heat energy from only said first geothermal fluid is transferred into said first power fluid in said first heat exchange step.

14. The method of claim 8, wherein said first power fluid circuit produces power by expansion of said first power fluid in a turbine, and which comprises transferring heat energy from exhaust vapor from said turbine in a third heat exchange step back into at least one of said power fluid circuits to raise the temperature of the power fluid in such circuit.

15. The method of claim 14, wherein heat energy is transferred into said first power fluid circuit in said third heat exchange step.

16. The method of claim 1, wherein the rate of flow of said second geothermal fluid is greater than that of said first geothermal fluid.

17. The method of claim 1, wherein said first and second geothermal wells are located in the same geothermal field and said first well is deeper than said second well.

18. The method of claim 1, wherein said first and second geothermal wells are located in the same geothermal field and said second well is more peripherally located in said field than said first well.

19. The method of claim 1, wherein at least one of said hot geothermal fluids is hot water.

20. The method of claim 1, wherein at least one of said hot geothermal fluids is steam.

21. The method of claim 1, wherein at least one of said hot geothermal fluids is a combination of hot water and steam.

22. A system for producing power from geothermal energy which comprises:

first and second geothermal wells respectively producing first and second hot geothermal fluids, said first geothermal fluid being produced at a higher temperature than said second geothermal fluid, closed power fluid circuit means comprising vapor expansion power-producing means and first and second heat exchanger means, fluid passage means from said first well to said first heat exchanger means to provide at least a portion of said first geothermal fluid to said first heat exchanger means to raise the temperature of power fluid in said circuit means to a first temperature, and fluid passage means from at least said second well to said second heat exchanger means to provide at least a portion of said second geothermal well fluid to said second heat exchanger means to raise the temperature of power fluid in said circuit means to a second temperature that is lower than said first temperature.

23. A system as defined in claim 22, wherein said first power fluid temperature is the highest temperature to which power fluid is raised in said cycle prior to expansion thereof to produce power.

24. A system as defined in claim 22, wherein said power fluid circuit means further comprises third heat exchanger means and said power-producing means comprises a turbine having exhaust vapor outlet means, and fluid passage means from said turbine outlet means to said third heat exchanger means to provide at least a portion of the exhaust vapor from said turbine to said third heat exchanger means to raise the temperature of power fluid in said circuit means.

25. A system as defined in claim 24, wherein power fluid is raised to a lower temperature in said third heat exchanger means than in said second heat exchanger means.

26. A system as defined in claim 24, wherein power fluid is raised to a higher temperature in said third heat exchanger means than in said second heat exchanger means.

27. A system as defined in claim 22, wherein said fluid passage means to said second heat exchanger means also communicates with said first well so as to provide at least a portion of said first geothermal fluid to said second heat exchanger means.

28. A system as defined in claim 22, wherein said power fluid circuit means comprises first and second closed circuit portions having respective first and second power fluids therein, said first power fluid having a higher boiling temperature than said second power fluid, and said first heat exchanger means being in communication with said first circuit portion.

29. A system as defined in claim 28, wherein said second heat exchanger means is in communication with said second circuit portion.

30. A system as defined in claim 28, wherein said first power fluid comprises isobutane.

31. A system as defined in claim 28, wherein said second power fluid comprises the refrigerant R-22.

32. A system as defined in claim 28, wherein said second power fluid comprises propane.

33. A system as defined in claim 28, wherein said power-producing means comprises a turbine in said first power fluid circuit portion, said turbine having exhaust vapor outlet means, third heat exchanger means in communication with at least one of said circuit portions, and fluid passage means from said turbine outlet means to said third heat exchanger means to provide at least a portion of the exhaust vapor from said turbine to said third heat exchanger means to raise the temperature of the power fluid in said one of said circuit portions.

34. A system as defined in claim 33, wherein said third heat exchanger means is in communication with said first power fluid circuit portion.

35. A system as defined in claim 22, wherein the rate of flow of said second geothermal fluid is greater than that of said first geothermal fluid.

36. A system as defined in claim 22, wherein said first and second geothermal wells are located in the same geothermal field and said first well is deeper than said second well.

37. A system as defined in claim 22, wherein said first and second geothermal wells are located in the same geothermal field and said second well is more peripherally located than said first well.

38. A system as defined in claim 22, wherein at least one of said hot geothermal fluids is hot water.

39. A system as defined in claim 22, wherein at least one of said hot geothermal fluids is steam.

40. A system as defined in claim 22, wherein at least one of said hot geothermal fluids is a combination of hot water and steam.

* * * * *